May 3, 1966

J. S. SENEY 3,249,864

APPARATUS FOR TESTING A PLURALITY OF TEMPERATURE-RESPONSIVE
CAPACITOR ELEMENTS

Filed July 28, 1961

INVENTOR
JOHN SEYMOUR SENEY

BY
Harry C. Braddock
ATTORNEY

May 3, 1966 J. S. SENEY 3,249,864
APPARATUS FOR TESTING A PLURALITY OF TEMPERATURE-RESPONSIVE
CAPACITOR ELEMENTS
Filed July 28, 1961 3 Sheets-Sheet 3

INVENTOR
JOHN SEYMOUR SENEY
BY
ATTORNEY

United States Patent Office 3,249,864
Patented May 3, 1966

3,249,864
APPARATUS FOR TESTING A PLURALITY OF TEMPERATURE-RESPONSIVE CAPACITOR ELEMENTS
John Seymour Seney, Seaford, Del., assignor to E. I. du Pont de Nemours and Company, Wilmington, Del., a corporation of Delaware
Filed July 28, 1961, Ser. No. 127,549
1 Claim. (Cl. 324—61)

This invention relates to a method and apparatus for testing electrical components and, in particular, to the testing of temperature-responsive capacitors under simulated service conditions.

Electrical capacitors are normally evaluated by directly measuring their capacitance. Many methods are known to do this, such as testing in a capacitance bridge or testing with an assembly line technique wherein the capacitor is tested in several stations on a go, no-go basis. In most applications, an electrical capacitor has a fixed value and it is desired that this value remain fixed, and consequently the tests are directed in that direction. In a particular application, such as the system disclosed in United States Patent No. 3,112,070, the capacitor is temperature-sensitive and is used as the sensing element in a temperature control system. In this end use, it is desirable to know, with certainty and accuracy, the temperature charactertistics of the capacitor. To do this, the normal testing systems and apparatus have been found inadequate and insufficient. It therefore has become necessary to provide a new system to meet the new testing requirements.

It is an object of this invention to provide an improved method for obtaining the temperature-variable characteristics of electrical capacitors.

It is a further object of this invention to provide a simple, economical, yet reliable, system for determining the above characteristics.

These objects are accomplished by a process which consists of subjecting a plurality of capacitors simultaneously to a number of maximum-minimum temperature cycles, placing the capacitors, one at a time, in sequence or stepwise, in an oscillator circuit for measuring and recording the frequency of the oscillator at the maximum temperature and the minimum temperature condition, and evaluating the tested units by comparing the frequencies so measured and recorded with previously established values. Further, this testing arrangement is carried out automatically for a number of cycles.

The process and apparatus, together with other objects and advantages thereof, will be disclosed and explained more fully in the specification which follows, reference being had to the accompanying drawings wherein.

Figure 1:
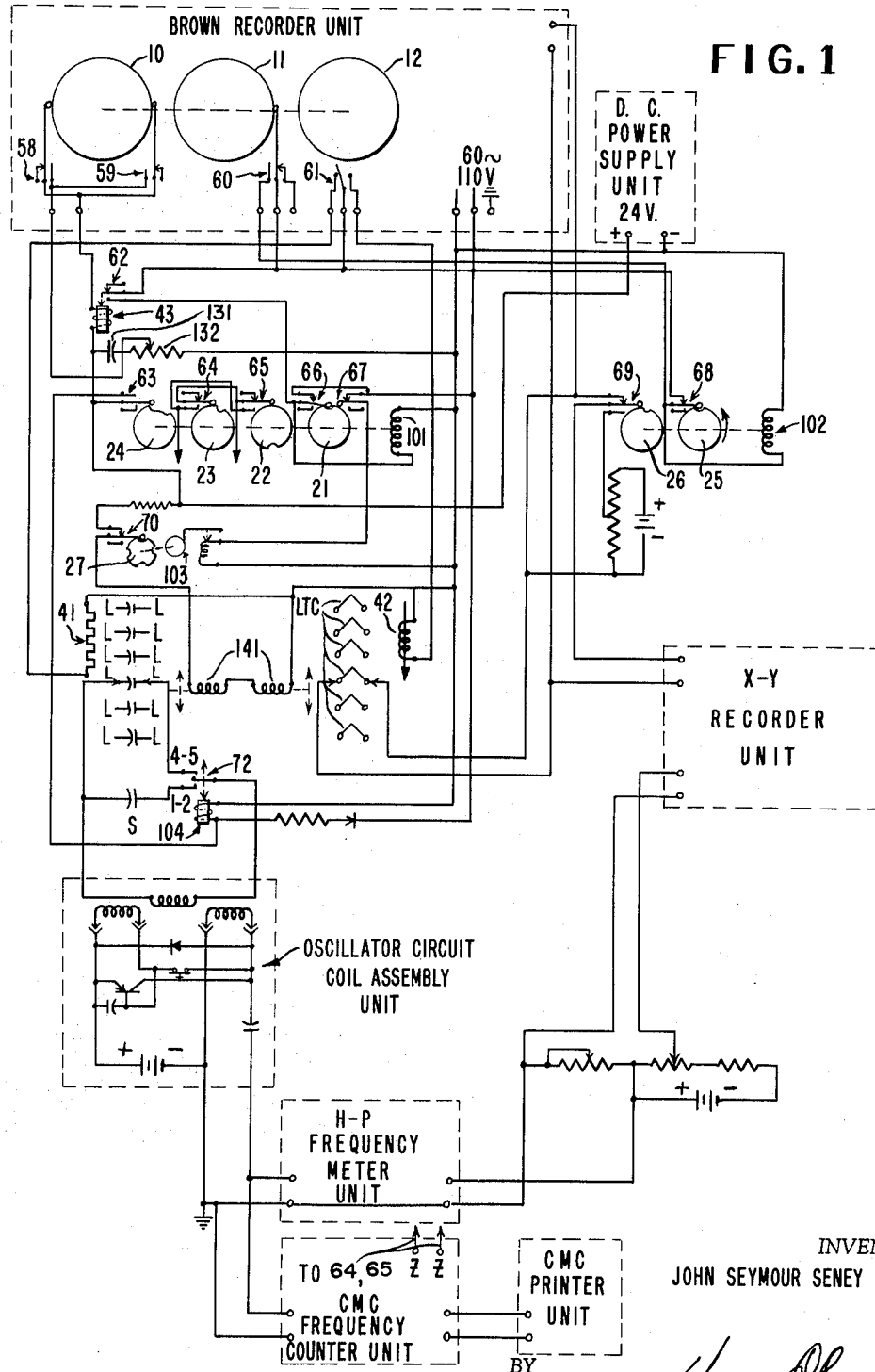
FIGURE 1 is a schematic circuit diagram of the test system arrangement of this invention.

Referring to the figures of the drawings, an essential part of the system consists of the test block B or test stand T in which the capacitors C with embedded temperature-measuring thermocouples are mounted in the cavities 71 provided. This will be discussed in more detail at a later point herein and is shown in detail in FIGURES 3 and 4. Control is initiated from the function operator unit 1 which controls the thermocouple stepping switch unit 2 and the capacitor stepping switch unit 3, and also furnishes a signal to the unit designated as the XY recorder unit 4. The first thermocouple under test is connected through the thermocouple stepping switch unit 2 to the Brown recorder unit 5 which initiates the start of the function operator unit cycle as will be disclosed in detail later. The first capacitor under test is connected through the capacitor stepping switch unit 3 to the oscillator circuit and coil unit 6. The output frequency from the oscillator circuit unit 6 is fed to a frequency meter unit 7 and to a counter unit 8. The output from the counter unit 8 is fed to a printer unit 9 which records the number of pulses in a set time interval. The output from the frequency meter unit is a D.C. voltage which is fed to the X axis of the XY recorder unit. The temperature signal from the thermocouple in the capacitor under test is fed to the Y axis of the XY recorder unit. Thus, a plot of capacitor temperature vs. the frequency controlled by each test capacitor is recorded on the XY recorder unit. The Brown recorder unit plots, as a function of time, the temperature of each tested capacitor unit.

Figure 2:
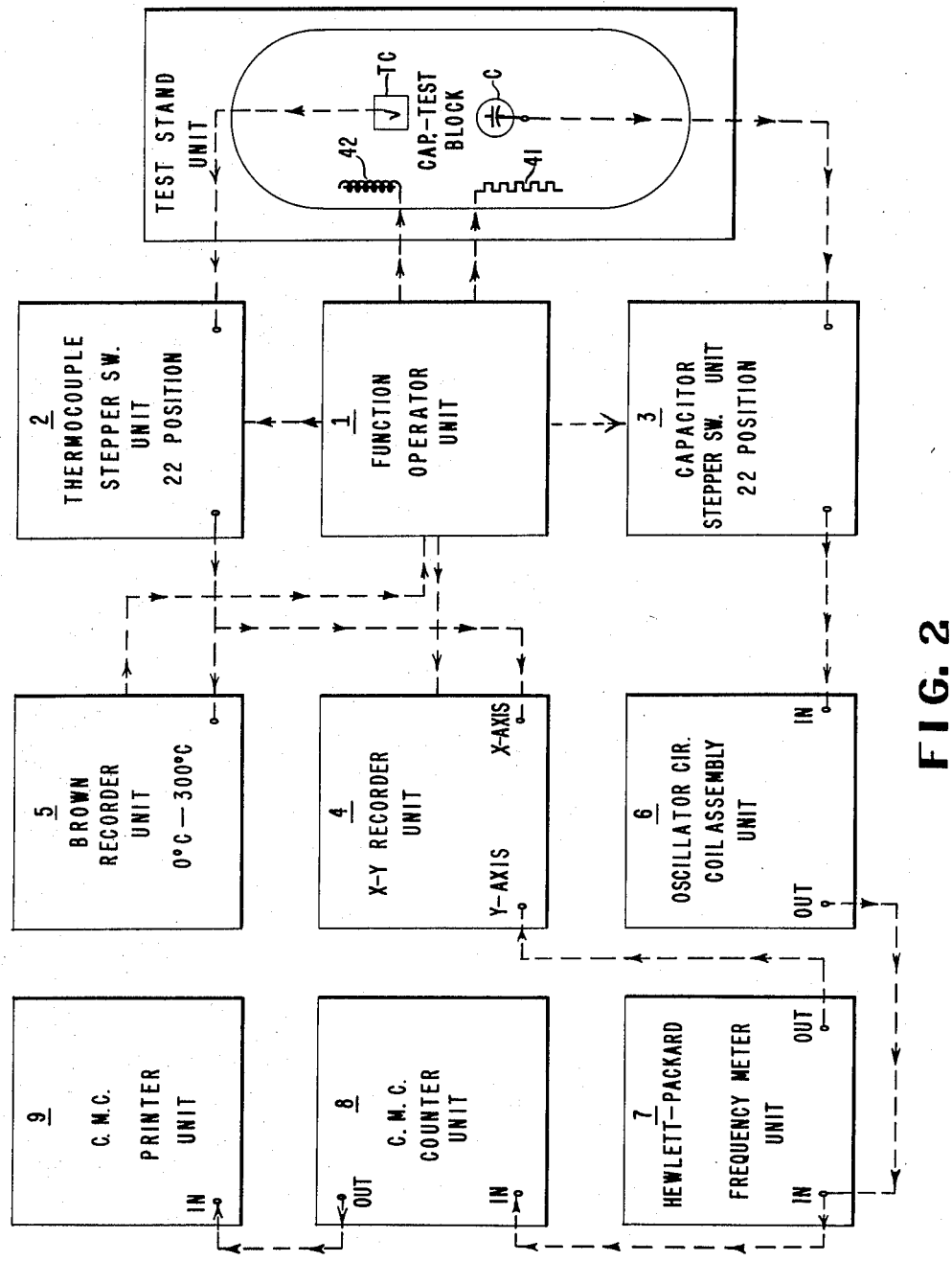
FIGURE 2 is a block diagram of the test system arrangement of the present invention.

Referring to FIGURE 1, mounted on the slide drum of the conventional Brown recorder unit are three cams 10, 11, and 12 which operate switches 58, 59, 60, and 61. Mounted in the function operator unit is a pulsing relay 43 which operates switch 62. Also mounted in this unit is a 20-second timer motor 101 (20 seconds for one revolution) which drives four cams 21, 22, 23, and 24. Cam 24 operates switch 63, cam 23 operates switch 64, cam 22 operates switch 65, and cam 21 operates switches 66 and 67. There is another timer motor 102, a 5-minute timer, which operates cams 25 and 26 which operate switches 68 and 69, respectively. Additionally, there is a ratchet relay 103 operating a cam 27 which operates switch 70 on every other excitation pulse. The oscillator circuit of the oscillator circuit coil assembly unit is identical to that disclosed in the United States Patent No. 3,112,070. The Hewlett-Packard frequency meter unit is a standard unit which receives pulses and produces a voltage proportional to the number of pulses received. The CMC frequency counter unit receives the pulses coming from a frequency source and, upon initiation from either of the two points marked Z to start timing, counts the number of pulses either for 1 second or 10 seconds as desired. The output from the frequency counter unit is the number of pulses in this time interval. This is fed to the CMC printer unit which prints on strip material, such as an adding machine tape, the number of pulses that the frequency counter unit received. A voltage divider circuit is preferably inserted between the output of the frequency meter unit and the Y axis of the XY recorder unit so that the proper scaling can be attained. Mounted in the actual test assembly or test stand T (FIGS. 2–4) are six heaters 41 which are controlled by switch 61. In addition, cooling water is circulated through passageways 81 in the test block B and is controlled by a solenoid water valve 42 which in turn is also controlled by switch 61.

Each capacitor C under test is encapsulated or embedded in a protective material M (FIG. 4) and, in addition, there is a thermocouple TC also embedded next to the capacitor. The capacitor stepping relays 141 which switch from the leads L of each test capacitor to the next, also step simultaneously to the leads LTC of each thermocouple. Associated with the oscillator circuit unit and the test capacitor is a standard .0008 microfarad capacitor S which is used to monitor any possible drift of the oscillator circuit. A relay 104 is used to switch, at the appropriate time, from the test capacitor to the standard capacitor. A polarized make-before-break switch 72 is used since it is essential that the oscillator have a capacitor associated with it at all times. Otherwise, the oscillator unit could stop oscillating and require a manual start-up.

Figure 3:
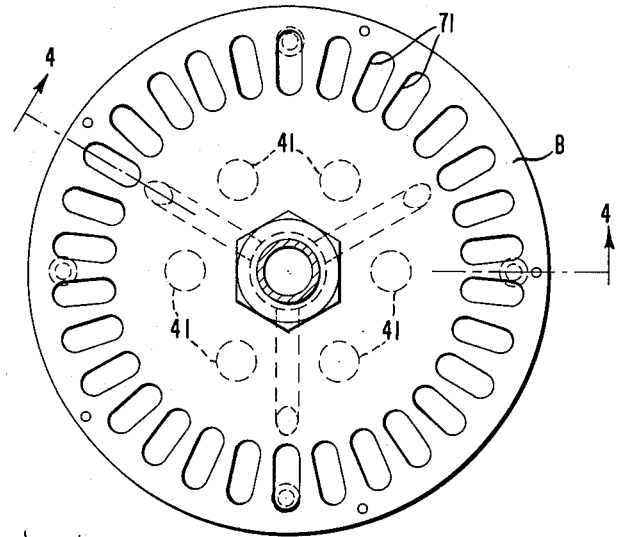
FIGURE 3 is a partial plan view of the test block forming a part of the system of this invention.
Figure 4:
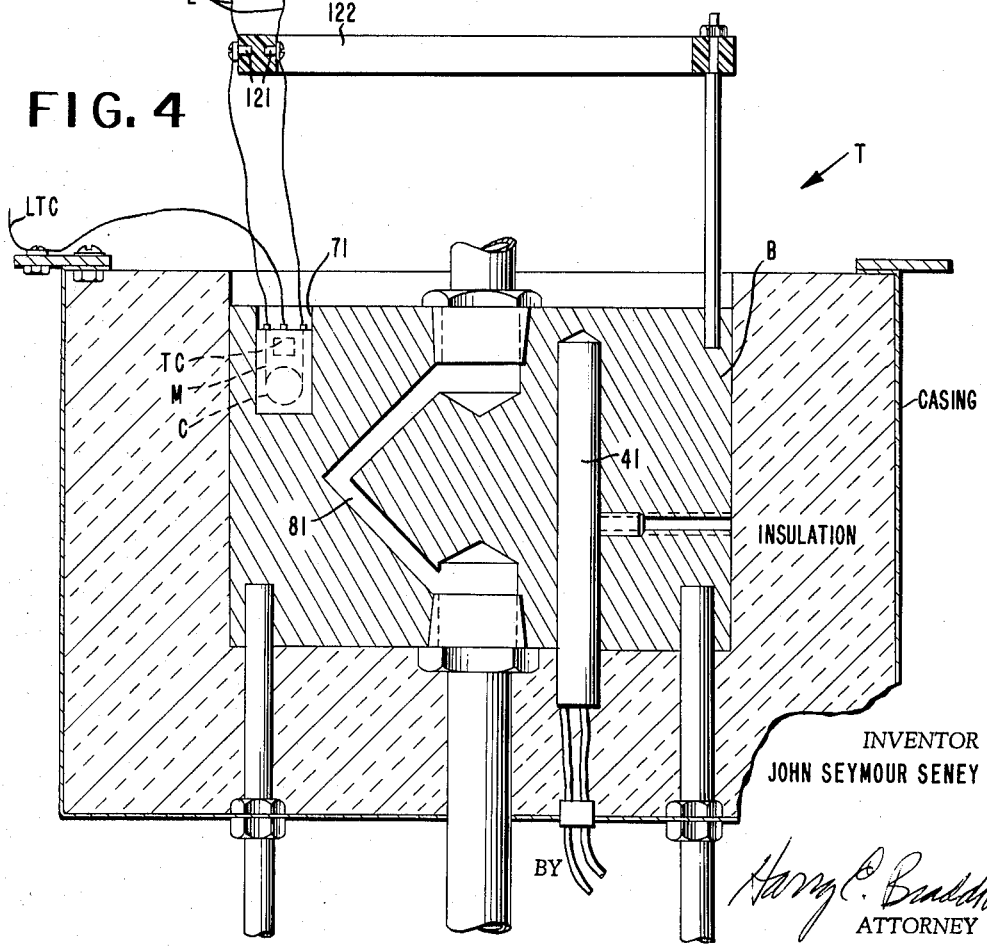
FIGURE 4 is a vertical cross-sectional view taken on line 4—4 in FIGURE 3.

The mechanical features of the test block B are shown in more detail in FIGURES 3 and 4. There are cavities or cutout portions 71 in the main block B for holding 30 test capacitor units C. As mentioned previously, there also are cavities for six electrical tubular heaters 41 to heat the test block. In addition, there are passageways 81 provided in the block so water can be circulated to cool the block. The leads L from the 30 test capacitors C are connected to the electrically insulated screws 121 on a terminal ring 122. The leads from the thermocouples are connected to electrically insulated terminal posts on a second terminal ring. Leads from the test block to the function operator unit individually connect each connection from the capacitors and the thermocouples to the appropriate contacts on the stepping relays 141 of the capacitor stepper switching unit and the thermocouple stepper switching unit. For ease of operation, this cable is at least several feet long, mainly to physically locate the two pieces of apparatus some distance apart, since it is preferable that the main circuit components such as the stepping relays, etc., not be affected by the temperature of the test block.

The sequence of operation of the capacitor tester apparatus is as follows: With the temperature descending to the low end of the scale, voltage is applied to capacitor 131 which charges to 24 volts D.C. through resistor 132. When 50° C. is recorded on the Brown recorder unit, low switch 58 closes. This causes the energy stored in capacitor 131 to be discharged into relay 43 which momentarily closes contact 62. Due to controlling the charging current through resistor 132, so that it is not enough to maintain the closed condition of contact 62, this pulse of current starts the 20-second timer motor 101 to operate through one cycle of operation. The cycle is maintained through contact 66. During this 20-second cycle, switch 64 closes momentarily and resets CMC counter unit. When switch 64 opens, this causes the printer unit to print out the frequency of cold capacitor on test. Cam 24 closes contacts of switch 63 which energizes relay 104 to position 1–2. The standard capacitor S remains in the oscillator circuit for 15 seconds until contacts 65 close (cam 22) and reset the CMC counter unit. The printer unit prints out the frequency of the standard capacitor when contacts 65 open. Then contacts 67, on cam 21, close momentarily and energize ratchet relay 103 and contacts of switch 70, which advance the stepper relays 141 to the leads of the next capacitor and thermocouple on test. This operation occurs at the low temperature point. The breaking of the contacts of switch 70 is the time the steppers advance.

Also during this cycle, the 5-minute timer motor 102 starts operating from contacts of switch 60 and maintains its cycle through contacts of switch 68 on cam 25. At the start-up of the 5-minute timer motor 102 current flows through contacts of switch 69 of cam 26 and advances the X axis of the XY recorder unit for approximately 18 seconds to assure that there will be no retracing over the last test cycle. This is done by reversing the current to the X axis and driving the chart beyond the zero point through an over-riding clutch (not shown).

When the temperature reaches the low point, switch 58 closes as discussed above. Approximately 3 seconds later, switch 61 closes which actuates heaters 41 to apply heat. Due to the time lag between the operation of this switch and the actual start-up of temperature increase, the previously described operations take place at the low temperature. When the heat is increasing, no measurements are made except the continuous frequency vs. temperature on the X-Y recorder and the temperature vs. time on the Brown recorder. When 200° C. is reached, contacts 59 close and start a complete 20-second cycle all over again in a similar manner to that performed by contacts of switch 58 at the low temperature. Again lagging behind the contacts 59 by a few seconds, contacts 61 will reverse to the cool position and turn on the water solenoid valve 42 to cause the water to flow and cool the tester down to 50° C. again. This operation repeats continuously through all the capacitors on test and will continue until stopped.

This tester is for evaluating the capacitors encapsulated by the technique described in my copending application Serial No. 117,082, filed June 14, 1961, and intended for use in the temperature control system described in United States Patent 3,112,070.

By testing capacitors in this manner, it is possible to ascertain whether these units will function when put into the system and establish minimum estimates of service life. It is essential for proper operation that the temperature-responsive capacitor provide a sufficient change in characteristics so that the measuring system can detect changes in the temperature of the system being evaluated or controlled. Consequently, it is necessary to determine the slope of the frequency vs. temperature curve in a conventional manner to ascertain this. This system is a simple, straightforward, improved testing system for evaluating capacitors in a simulated operating condition.

While this system has been described with regard to testing capacitors, it is obvious that it could be used for testing any other electrical components or other devices which are used under varying temperature conditions. Consequently, the invention is intended to be limited only by the scope of the appended claim.

I claim:

An improved apparatus for automatic continuous testing of a plurality of electrical capacitance units, each of said units of the type comprising a capacitor element, a temperature sensing device arranged therewith in a compact assembly in a unit, and electrical lead wires connected to said capacitor element and said temperature sensing device, said apparatus comprising, in combination, a supporting frame unit, said frame unit comprising a plurality of capacitance unit receiving and supporting stations and a first means for subjecting all of said stations to a controlled cyclic variation in temperature between a given lower limit and a given upper limit, a control means operatively associated with said first means for cyclically controlling said first means, a first terminal block unit spaced from said supporting frame unit and comprising a plurality of electrically insulated contact elements, each of said contact elements are provided with means constructed and arranged for releasable electrical connection with said lead wires of a different one of said capacitor elements in said capacitance units when positioned in one of said stations in said frame unit, a second terminal block unit adjacent said first terminal block unit and comprising a plurality of electrically insulated contact elements each of which are provided with means constructed and arranged for releasable electrical connection with said lead wires of a different one of said temperature sensing devices in said capacitance units when positioned in one of said stations, a two-coordinate frequency-temperature recording unit, an electrical oscillator circuit operatively connected to said recording unit, a power source for operating the circuit at a given frequency, a switching unit operatively electrically connected to said first and second terminal blocks, said oscillator circuit and said recording unit for sequentially coupling the capacitor elements into said oscillator circuit to vary the frequency thereof and simultaneously sequentially coupling the temperature sensing device of the same capacitance unit to said recording unit so that said recording unit graphically records in sequence the varied oscillator frequency versus the varied temperature for each of said capacitance units, and means responsive to the repetition of the temperature cycle of said first means for operating said switching unit in its sequential step-by-step switching from the lead wires of one capacitance unit to the next.

References Cited by the Examiner

UNITED STATES PATENTS

| | | | |
|---|---|---|---|
| 2,456,811 | 12/1948 | Blackburn | 73—341 X |
| 2,472,814 | 6/1949 | Elliott | 324—60 |
| 2,613,249 | 10/1952 | Babb | 324—61 |
| 2,874,351 | 2/1959 | Lamont | 324—57 |

FREDERICK M. STRADER, *Primary Examiner.*

WALTER L. CARLSON, *Examiner.*